(12) United States Patent
Endresen et al.

(10) Patent No.: US 9,143,799 B2
(45) Date of Patent: Sep. 22, 2015

(54) METHOD, APPARATUS AND COMPUTER PROGRAM PRODUCT FOR IMAGE MOTION PREDICTION

(75) Inventors: Lars Petter Endresen, Nesoddtangen (NO); Steinar Midtskogen, Oslo (NO); Stian Selnes, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 576 days.

(21) Appl. No.: 13/117,910

(22) Filed: May 27, 2011

(65) Prior Publication Data

US 2012/0300845 A1     Nov. 29, 2012

(51) Int. Cl.
  *H04N 19/80* (2014.01)
  *H04N 19/533* (2014.01)
  *H04N 19/557* (2014.01)
  *H04N 19/61* (2014.01)
  *H04N 19/523* (2014.01)

(52) U.S. Cl.
  CPC ............ *H04N 19/557* (2014.11); *H04N 19/523* (2014.11); *H04N 19/533* (2014.11); *H04N 19/61* (2014.11); *H04N 19/80* (2014.11)

(58) Field of Classification Search
  None
  See application file for complete search history.

(56) References Cited

U.S. PATENT DOCUMENTS

| | | | |
|---|---|---|---|
| 6,141,382 A * | 10/2000 | Krishnamurthy et al. | 375/240.17 |
| 2005/0286777 A1* | 12/2005 | Kumar et al. | 382/232 |
| 2009/0080525 A1* | 3/2009 | Haskell et al. | 375/240.16 |
| 2009/0135901 A1* | 5/2009 | Au et al. | 375/240.02 |
| 2010/0002770 A1* | 1/2010 | Motta et al. | 375/240.16 |
| 2010/0027662 A1* | 2/2010 | Pigeon | 375/240.16 |
| 2010/0080297 A1* | 4/2010 | Wang et al. | 375/240.16 |
| 2010/0086048 A1* | 4/2010 | Ishtiaq et al. | 375/240.16 |
| 2010/0111182 A1* | 5/2010 | Karczewicz et al. | 375/240.16 |
| 2010/0111187 A1* | 5/2010 | Chujoh et al. | 375/240.16 |

FOREIGN PATENT DOCUMENTS

| | | |
|---|---|---|
| EP | 1 073 276 A2 | 1/2001 |
| EP | 1 073 276 A3 | 1/2001 |
| EP | 1 431 917 A2 | 6/2004 |

(Continued)

OTHER PUBLICATIONS

Borman et al, "Block-Matching Sub-Pixel Motion Estimation from Noisy, Under-Sampled Frames", Proc. SPIE Conf. Visual Communications and Image Processing, San Jose, CA, Jan. 25-27, 1999.*

(Continued)

*Primary Examiner* — Jay Patel
*Assistant Examiner* — Reza Aghevli
(74) *Attorney, Agent, or Firm* — Lempia Summerfield Katz LLC (57) ABSTRACT

A video processing system, method and computer program storage device cooperate to provide a resource and performance efficient sub-pixel motion search operation. Using on the fly calculations it is possible to provide approximations of sub-pixel positions on one image with respect to another image in an image sequence. A sub-pixel position used to set a motion vector for an encoding process may then be identified with reduced processing and memory resources relative to conventional techniques. Also, by later performing a full encoding cost analysis on the earlier identified sub-pixel position, and keeping track of differences, an interpolation accuracy may be dynamically improved by applying the differences to subsequent image frames.

22 Claims, 8 Drawing Sheets

(56) References Cited

FOREIGN PATENT DOCUMENTS

EP          1 431 917 A3    6/2004
WO      WO 00/18135 A1      3/2000

OTHER PUBLICATIONS

Cheung et al, "A Hierarchical Block Motion Estimation Algorithm Using Partial Distortion Measure", Proc. Int'l. Conf. Image Processing, Oct. 1997, vol. 3, pp. 606-609.*

Li et al, "Successive Estimation Algorithm for Motion Estimation", IEEE Trans. Image Processing, Jan. 1995, vol. 4, No. 1, pp. 105-107.*

International Search Report and Written Opinion issued Aug. 21, 2012 in PCT/US2012/039587 filed May 25, 2012.

Yueh-Yi Wang, et al., "An Efficient Dual-Interpolator Architecture for Sub-pixel Motion Estimation", Conference Proceedings/IEEE International Symposium on Circuits and Systems, XP010816200, May 23, 2005, pp. 2907-2910.

Zhenyu Wei, et al., "A New Full-pixel and Sub-pixel Motion Vector Search Algorithm for Fast Block-matching Motion Estimation in H.264", Proceedings of the Third International Conference on Image and Graphics, XP010779061, Dec. 18, 2004, 4 pages.

Alireza Aminlou, et al., "Low Complexity Hardware Implementation of Reciprocal Fractional Motion Estimation for H.264/AVC in Mobile Applications", Picture Coding Symposium, XP031491657, May 6, 2009, 4 pages.

* cited by examiner

RELATED ART

Figure 2

RELATED ART

METHOD, APPARATUS AND COMPUTER PROGRAM PRODUCT FOR IMAGE MOTION PREDICTION

BACKGROUND OF THE INVENTION

1. Field of the Invention

The present disclosure relates to advances in areas including video systems, computer program product, and methods, and in particular to video compression/decompression in digital video systems, software-enabled devices and methods.

2. Description of the Related Art

The "background" description provided herein is for the purpose of generally presenting the context of the disclosure. Insight provided by the present inventors, to the extent it is described in this background section, as well as aspects of the description which may not otherwise qualify as prior art at the time of filing, are neither expressly or impliedly admitted as prior art.

Transmission of moving pictures in real-time is employed in numerous applications such as video conferencing, "net meetings", television (TV) broadcasting and video telephony.

However, representing moving pictures involves bulk information, in digital form, and is described by representing each picture element (pixel) in a picture (or image frame) with 8 bits (1 Byte). Aggregation of uncompressed video data results in very large bit quantities, and as a consequence demands large bandwidth allocation for transmission over conventional communication networks in real time due to limited bandwidth.

Due to significant reduncancy in images between successive frames, data compression is freely applied in real time video transmission applications. Data compression may, however, compromise picture quality and so persistent efforts continue to be made to develop data compression techniques allowing real time transmission of high quality video over bandwidth limited resources.

In video compression systems, an objective is to represent the video information with as little "capacity" as possible, where capacity is usually measured in bits, either as a constant value or as bits/time unit. By minimizing bits, the amount of bits that need to be transmitted is reduced, and therefore, the amount of communication resources needed to support the real time transmission of video data is also reduced.

The most common video coding methods are described in the MPEG* (e.g., MPEG 2 and MPEG 3) and H.26* (e.g., H.263 and H.264) standards. According to these standards, the video data is exposed to four main processes before transmission, namely prediction, transformation, quantization and entropy coding.

The prediction process significantly reduces the number of bits required for each frame in a video sequence to be transferred. It takes advantage of the similarity of parts of the sequence with other parts of the sequence. A decoder that decodes the bit stream has side information to assist in the decoding process. This side information is known to both encoder and decoder and so only the difference has to be transferred. This difference typically requires much less capacity for its representation than the full image. The motion estimation aspect of the prediction is mainly based on picture content from previously reconstructed pictures where the location of the content is defined by motion vectors. The prediction process is typically performed on square block sizes (e.g. 16×16 pixels), although the size of the blocks may vary.

In a typical video sequence, the content of a present block "M" would be similar to a corresponding block in a previously decoded picture. If no changes have occurred since the previously decoded picture (i.e., an image in a new frame is the same as the image in the past frame), the content of M would be equal to a block of the same location in the previously decoded picture. In other cases, an object in the picture may have been moved between frames so that the content of M is more similar to a block of a different location in the previously decoded picture. Such movements are represented by a motion vector (V). As an example, a motion vector of (3;4) means that the content of M has moved 3 pixels to the left and 4 pixels upwards since the previously decoded picture. For improved accuracy, the vector may also include decimals, requiring interpolation between the pixels.

In H.262, H.263, MPEG1, MPEG2 the same concept is extended so that motion vectors also can take ½ pixel values. A vector component of 5.5 then implies that the motion is relative to the midway point between 5 and 6 pixels. More specifically the prediction is obtained by taking the average between the pixel representing a motion of 5 and the pixel representing a motion of 6. This prediction is conventionally performed with a 2-tap filter due to the operation on 2 pixels to obtain prediction of a pixel between the two. Since filter operations can be defined by an impulse response, the operation of averaging 2 pixels can be expressed with an impulse response of (½, ½). Similarly, averaging over 4 pixels implies an impulse response of (¼,¼,¼,¼).

The purpose of the averaging is to define a motion of the picture content with an accuracy of ½ pixel, which provides improved coding efficiency as compared with encoders that only operate on integer pixels.

In the MPEG4 and H.264/AVC, coding methods have improved both in terms of motion resolution and number of pixels for each interpolation. The methods use motion compensated prediction with ¼ pixel accuracy. Even ⅛ pixel accuracy is defined, but not included in any profile.

Figure 1:
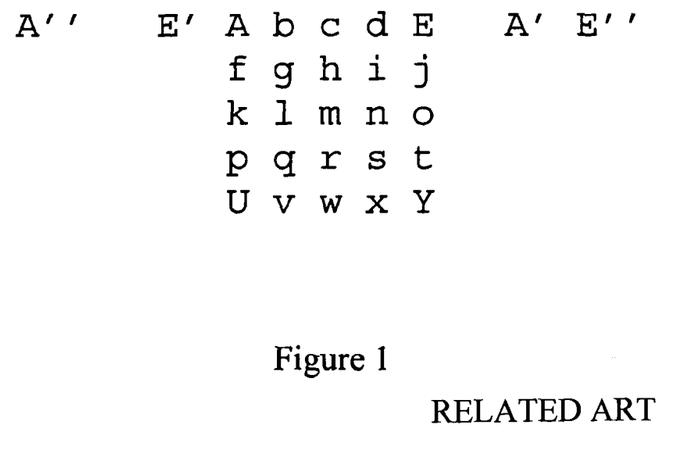
FIG. 1 is an example of a sub-pixel layout used in specifying motion vectors between successive images.

The integer- and fractional pixel positions are indicated in FIG. 1 (for simplicity, interpolations are only shown between pixels A and E). The positions A E U Y indicate integer pixel positions, and A", E', A' and E" indicate additional integer positions on the A-E line. c k m o w indicate half pixel positions. The interpolated values in these positions are obtained by using a 6-tap filter with impulse response (1/32, −5/32, 20/32, 20/32, −5/32, 1/32) operating on integer pixel values. As an example, c is calculated by the following expression, which represents a filter:

$$c = 1/32 \cdot A'' - 5/32 \cdot E' + 20/32 \cdot A + 20/32 \cdot E - 5/32 \cdot A' + 1/32 \cdot E''$$

The filter is operated horizontally or vertically as appropriate. Further, to obtain the value for m, the filter is not operated on integer values, but on already interpolated values in the other direction. The remaining positions are obtained by averaging respective integer- and half neighbor pixel positions:

$$b=(A+c)/2,\ d=(c+E)/2,\ f=(A+k)/2,\ g=(c+k)/2,\ h=(c+m)/2,\ i=(c+o)/2,\ j=(E+o)/2$$

$$l=(k+m)/2,\ n=(m+o)/2,\ p=(U+k)/2,\ q=(k+w)/2,\ r=(m+w)/2,\ s=(w+o)/2,\ t=(Y+o)/2.$$

Figure 2:
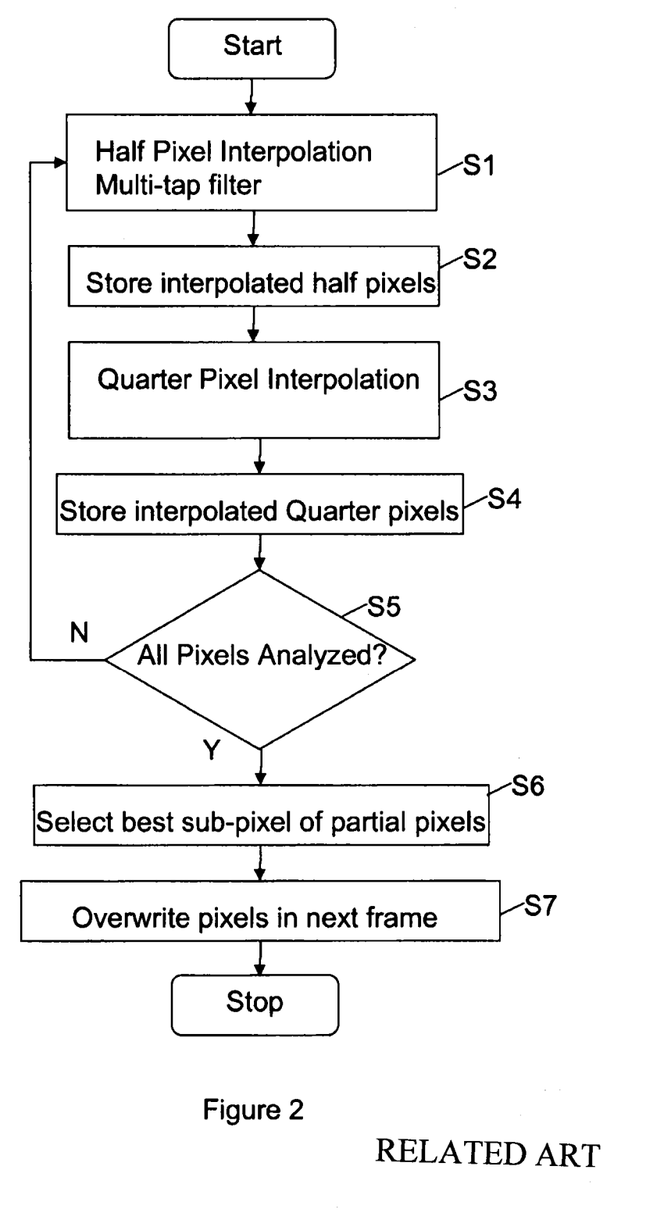
FIG. 2 is a flow chart of a process according to conventional practice that calculates and stores sub-pixel interpolation values for all candidate sub-pixel positions as a prerequisite for later selecting a best sub-pixel position, albeit requiring multiple passes of a memory buffer.

FIG. 2 is a flowchart of a conventional motion estimation process involving sub-pixel interpolation. The process begins at step S1 where a multi-tap filter is used to perform half-pixel interpolation with two pixels. The interpolated half-pixels are stored in a buffer memory in step S2. The process then proceeds to step S3 where quarter pixel interpolation is performed by averaging respective integer- and half pixel positions. Subsequently the interpolated quarter pixels are stored in step S4. Then in step S5 a query is made regarding whether all the pixels have been analyzed. If the response to the query in step S5 is affirmative, the process proceeds to step S6 where a best pixel or sub-pixel is selected. In this context a "best pixel or sub-pixel" is one that yields a lowest cost (measured in bits). If the response to the query in step S5 is negative, the process returns to step S1 where other pixels in a candidate block are analyzed and steps S1 through S4 are performed. Once the best pixel or partial pixel is selected in step S6 as being the best pixel or sub-pixel identifying the motion vector from one frame to the next, the process proceeds to step S7 where the calculated and stored interpolated half and quarter pixel values are over written by the next frame. Subsequently the process stops.

SUMMARY

The following paragraphs have been provided by way of general introduction, and are not intended to limit the scope of the appended claims. The described embodiments, together with further advantages, will be best understood by reference to the following detailed description taken in conjunction with the accompanying drawings.

The present inventors recognized that conventional methods to determine sub-pixel interpolation planes are based on multiple memory read/write cycles and unused hypothesis calculations that increase processor and memory demands without a corresponding improvement in sub-pixel plane motion vector detection. Moreover, the half, quarter or finer sub-pixel interpolation planes are generated in separate passes of data contained in the frame buffer. Then the motion estimation process searches these planes to determine the best motion vector. However, this multi-step process requires calculations of many interpolation positions that are never used, and thus imposing unnecessary time delay and processor consumption requirements on the system. In addition, calculation of a large number of interpolated pixels requires a corresponding amount of frame buffer capacity to hold the intermediate results until the results can later be culled to find a best result, thereby imposing further demands on system memory capacity.

With increasing resolution of video frames in present and emerging video applications, the conventional motion search process, discussed above, will lead to further inflation of processor usage and memory usage requirements.

In light of identifying the limitations with conventional approaches, the present inventors identified an approach for dynamically ("on the fly") calculating the interpolated sub-pixel positions and deciding on whether the results are sufficient. A sub-pixel position is considered acceptable if the deviation between the real position and the approximated position is below a predetermined, dynamic, threshold.

By calculating the interpolated pixel positions on the fly, redundant sub-pixel positions need not be calculated, intermediate storage/retrieval of sub-pixel positions in multiple passes of a memory buffer are avoided, which in turn results in lower processing and memory capacity demands.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 3:
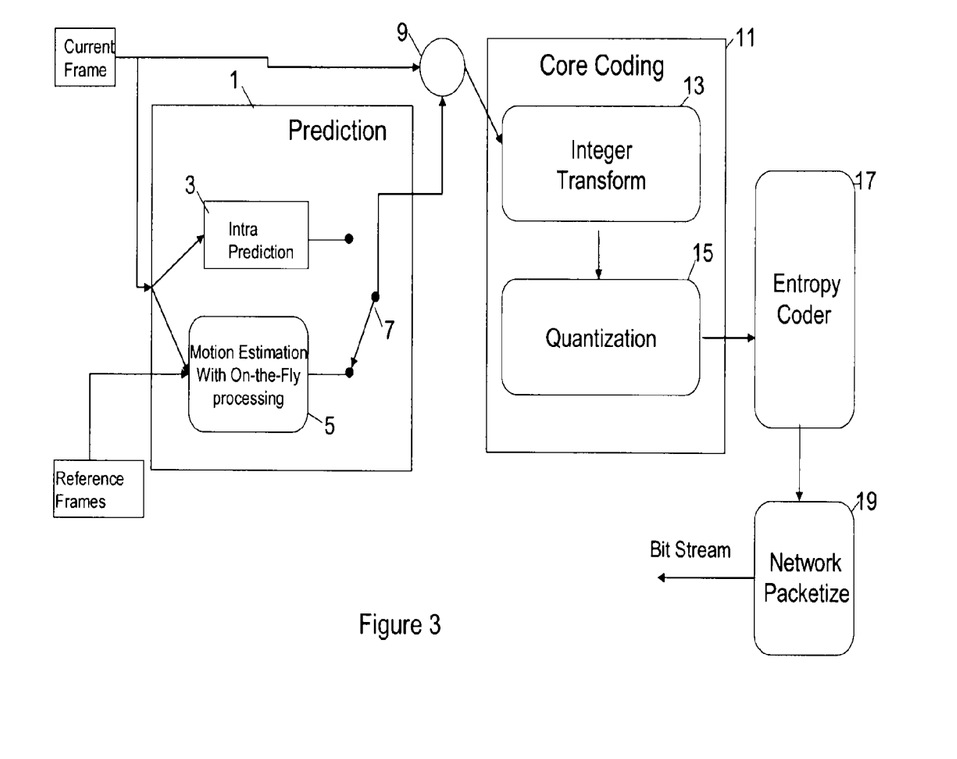
FIG. 3 is a block diagram of a video encoder that includes a motion estimation functionality according to the present disclosure.

These and other features, aspects and advantages of the present invention will become better understood with regard to the following description, appended claims and accompanying drawings wherein:

FIG. 3 is a block diagram showing a process flow involving four main encoding processes. A current frame as well as one or more reference frames are input to a prediction processor 1. The prediction processor 1 includes an intra prediction processing path 3 and a motion estimation processing path 5 that includes on-the-fly motion estimation processing, the selection of which is controlled by switch 7. Intra prediction processing is selected for finding similarities within the current image frame, and is thus referred to as "intra" prediction. Motion estimation has a temporal component and thus involves analysis between successive frames that is referred to as "inter" prediction.

The data output from the switch 7 is combined with the pixels of the current frame in a combiner 9, prior to being subjected to core coding 11, which includes a transform process 13 (often involving rate distortion control). The transformed data is then subjected to quantization in a quantizer 15 and then subject to an entropy encoder 17. Entropy encoding removes redundancies without losing information, and is referred to as a lossless encoding process. Subsequently, the encoded data is arranged in network packets via a packetizer 19, prior to be transmitted in a bit stream.

Figure 4:
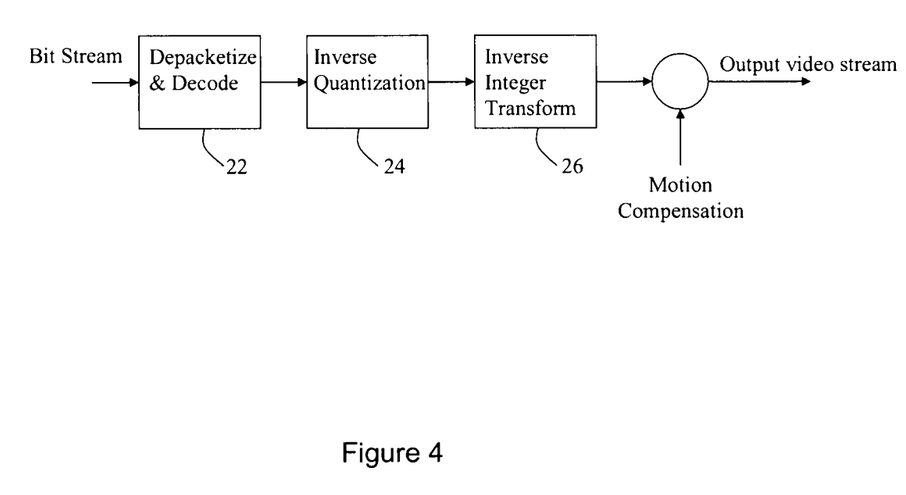
FIG. 4 is a block diagram of a video decoder that includes an ability to perform image reconstruction of an image using a motion estimation operation performed according to the present disclosure.

FIG. 4 is a block diagram showing a process flow within a decoder device according to an embodiment. An input bit stream from an encoder is applied to a depacketizer and decoder 22, which unpackages the data before sending the data to an inverse quantizer 24. The inverse quantizer 24 provides a best-effort at providing an inverse of the quantization performed in the quantization 15 (FIG. 3). The output of the inverse quantization 24 is applied to an inverse integer transform 26, which performs an inverse to the integer transform performed in the video encoder (FIG. 3). The integer transform 26 uses the same vectors as in the transform matrix to arrive at the original residue data, which was originally applied to the transform matrix in the encoder. The residue data is then subjected to a reconstruction operation using a motion compensation input (vector) to produce an output video stream.

Returning now to the encoder of FIG. 3, the present inventors recognized that an easily calculated, bilinear, on-the-fly (or dynamic) calculation can be used in a video coder's motion vector search with a limited loss in compression compared to the more computationally expensive multi-tap FIR filters that are employed in conventional approaches. For practical implementations this simplifies the encoding process significantly as both memory and processor usage is reduced substantially. "On the fly" refers to calculations performed when needed, as opposed to conventional approaches that perform multi-tap filter calculations in advance, and save the results in memory, for multiple pixel and sub-pixel locations before selecting a best pixel or subpixel position.

A penalty when calculating the interpolated pixel position using the standard multi-tap FIR filters is that many expensive intermediate steps may be required to achieve the desired result. Then the benefits are outweighed by the infrastructure and processing load costs. As an alternative, and as disclosed herein, an approximation of the interpolated pixel positions may be made by using processor-based bilinear averaging process, where the calculations become quick and efficient. Once the motion vector with the least approximated "cost" has been determined, the actual interpolation can subsequently be performed using the standard multi-tap FIR filters for the best pixel (or small subset of candidate best pixels). The least cost is approximated because a guarantee that the position with the least cost is found would require a computationally expensive full search. Thus, a reasonable approximation is made at a local minimum, below a defined threshold.

However, the penalty of the added interpolation step is minimal as this is done after the numerous cost calculations in the motion search are performed. Cost can be measured in terms of a sum of absolute differences (SAD), for example, as will be discussed.

A main advantage with this approach is that the loss in compression efficiency in most cases is minor—searching in the rough bilinear interpolate positions gives a surprisingly good estimate of the optimal motion vector, and the advantages of reduced memory and processor usage becomes overwhelming.

Another feature is that it is possible to reclaim a part of the loss in compression efficiency due to the use of the bilinear approximation. Motion search algorithms commonly use SAD as a metric for the correlation of the original and motion compensated block. The measure to be used in SAD is a combination of reconstruction error or distortion (D) and required bits to code the block (R). In some H.264 processes the search for the best coding mode is done in 2 steps indicated in the sections below.

Assume that the uncoded pixels of a block are O(i,j) and the reconstructed pixels are O'(i,j). For inter prediction the following first cost function is calculated for each displacement vector:

$$\text{Cost } 1 = \sum_{i,j} |O(i, j) - O'(i, j)| + \lambda_1 R_m,$$

wherein
Rm is the number of bits to code the vector,
λ1 is a multiplier that may be selected in dependency on the quality of reconstruction, and the sum $$D1 = \sum_{i,j} |O(i, j) - O'(i, j)|$$

is a distortion.

It is this way of calculating the distortion, D1, which is referred to as "SAD", or sum of absolute differences.

Using the approximate interpolations will generally introduce an additional error and lead to higher SAD values depending on the sub pixel position, and it will therefore affect the motion search result. However, keeping a record for every sub pixel position, allows for the adaptive tracking of differences between the SAD from the approximation and the SAD obtained using the exact filter. This is calculated once every time the motion search algorithm has completed for a block, and therefore, is not a processor or memory intensive process.

Adaptivity can be obtained by applying an infinite impulse response (IIR) filter. For example, the value stored in the record for each sub pixel position could be 1/256 of the current difference plus 255/256 of the previous value, using 0 as a suitable initial value, for example. The adaptivity makes the method universal for any approximation and video input. The values in the record are then used as a feedback to the motion search algorithm. When the algorithm calculates the SAD using the approximate filter, it will subtract the value found in the record for the corresponding sub pixel position. This will tend to correct the biases to certain sub pixel positions introduced by the approximation and make it more likely that the motion search algorithm will pick the vector it would have picked if it had used the exact filter.

Figure 5:
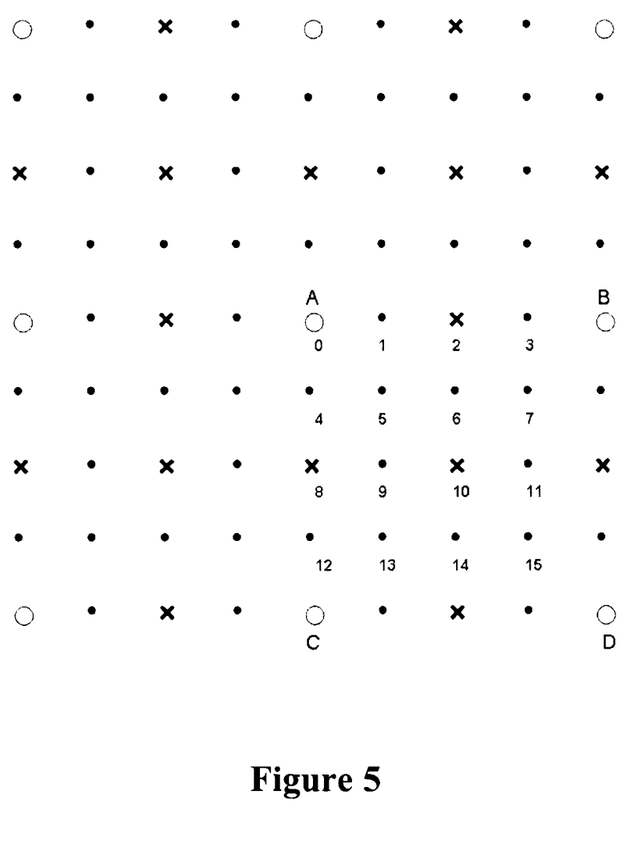
FIG. 5 is a subpixel layout used for performing dynamic sub-pixel estimation calculations.

The present embodiment can be illustrated with, but are not in any way limited to, the full, half and quarter pixel interpolation positions in the H264 encoding standard. The processes can be described as follows, and will subsequently be discussed in more detail with respect to FIG. 5:

1. Determine the best full pixel position. It should be noted that a block of N×N pixels (e.g., block of 16×16 pixels) containing the pixel or sub-pixel that is best, can be determined in advance as part of a conventional motion search process to identify a corresponding block in an image that corresponds with image features in a preceding image(s). Once the N×N pixel region has been isolated, the issue then becomes which particular full pixel, or a sub-pixel position provides the most accurate motion vector prediction.

2. Determine the best half pixel position, between adjacent pixels in the N×N region. Make this determination on-the-fly using bilinear averages and deciding whether an average for a particular sub-pixel is within a predetermined accuracy threshold for identifying a best match. An investigation of all sub-pixel positions is not performed, as this would require a computationally expensive brute force full search. Instead, a search is performed by way of a search algorithm, using certain candidates and surroundings that are likely to be a good match. Sometimes, the motion search fails to find a match that is below the required threshold, but still the search is terminated to obtain a result that can be used in practice. The established threshold is dynamically set according to the predetermined quality.

3. Determine the best quarter pixel position, between adjacent pixels in the N×N region. Make this determination on-the-fly using bilinear averages and deciding whether an average for a particular sub-pixel is within a predetermined accuracy threshold for identifying a best match.

4. Calculate and store the best N×N block oriented around the best pixel or sub-pixel position.

5. Calculate the SAD and MVCOST of the best N×N block.

Figure 6:
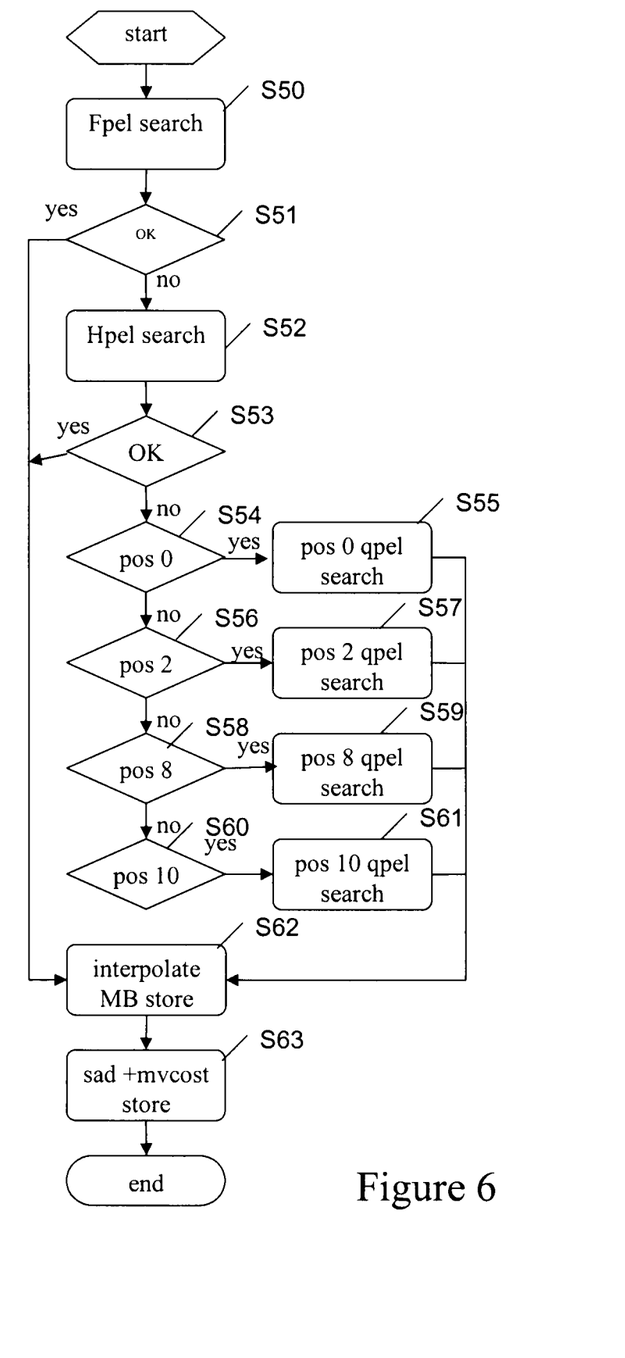
FIG. 6 is a flowchart of an on-the-fly motion vector search process performed according to at least one disclosed embodiment.

While conventional approaches use the exact 6-tap (in general multi-tap) filters when calculating the best half and quarter pixel (in general finer) positions, the present approaches uses a combination of simple bilinear averages (steps 2 and 3 described above). FIG. 6 is a flow chart describing process steps performed to determine a best full, half, quarter pixel positions using on-the-fly using bilinear averages. The process begins in step S50, where a full pixel search is performed. As will be discussed below with regard to particular bilinear equations provided, the best pixel value may serve as the initial position around which the motion search is performed. A SAD analysis is performed on the full pixel values and if none of the values are within an acceptable range i.e., below a threshold, because the full pixel values are deemed "good enough", the full pixel search stops since a particular pixel is deemed close enough. However, if the SAD is not below an acceptable threshold the process proceeds to step S51 where a query is made. Typically a codec is provided with certain quality controlled tables that specifies the thresholds. Although a broad range of thresholds may be employed, the thresholds are based on a mathematical relation between the highest SAD value, which relates to maximum pixel value, the number of pixels that are compared and a pre-defined quality parameter. If a maximum integer pixel value is 9, and 3 pixels are compared, the maximum SAD would be 3×9=27 and the percentage of this value, 27, multiplied by the quality parameter Q, is the threshold, such as Q×1%, Q×5%, or Q×10% for example. The quality parameter Q is a coefficient that may be one or a fraction for example.

If the response to the query in step S51 is affirmative the process proceeds to step S62 where a full interpolation analysis is done on the N×N block centered on the selected pixel and then on then the values for the N×N block are stored. However if the response to the query in step S51 is negative, the process proceeds to step S52 where a half-pixel on-the-fly search is performed. As part of this process the SAD values of the half-pixel search are compared with the threshold and if sufficiently below the threshold then the process proceeds to step S62. On the other hand if the SAD values are all above the threshold the process proceeds to step S53 where different quarter-pixel values are searched in four different regions around half pixel positions (POS 0, POS2, POS8, POS10) in steps S54, S56, S58, S60. Searches then are then respectively performed at position 0, 2, 8 and 10 in steps S55, S57, S59 and S61 to determine which position provides an SAD below the threshold. The output of the process then proceeds to step S62 where an actual interpolation is made and a full end by end block is stored. Then, as discussed above the process proceeds to step S63, where the SAD and MV cost values are stored for subsequent use in adaptively changing threshold values, thereby reducing any losses made via the bilinear estimation. Subsequently the process ends.

Figure 7:
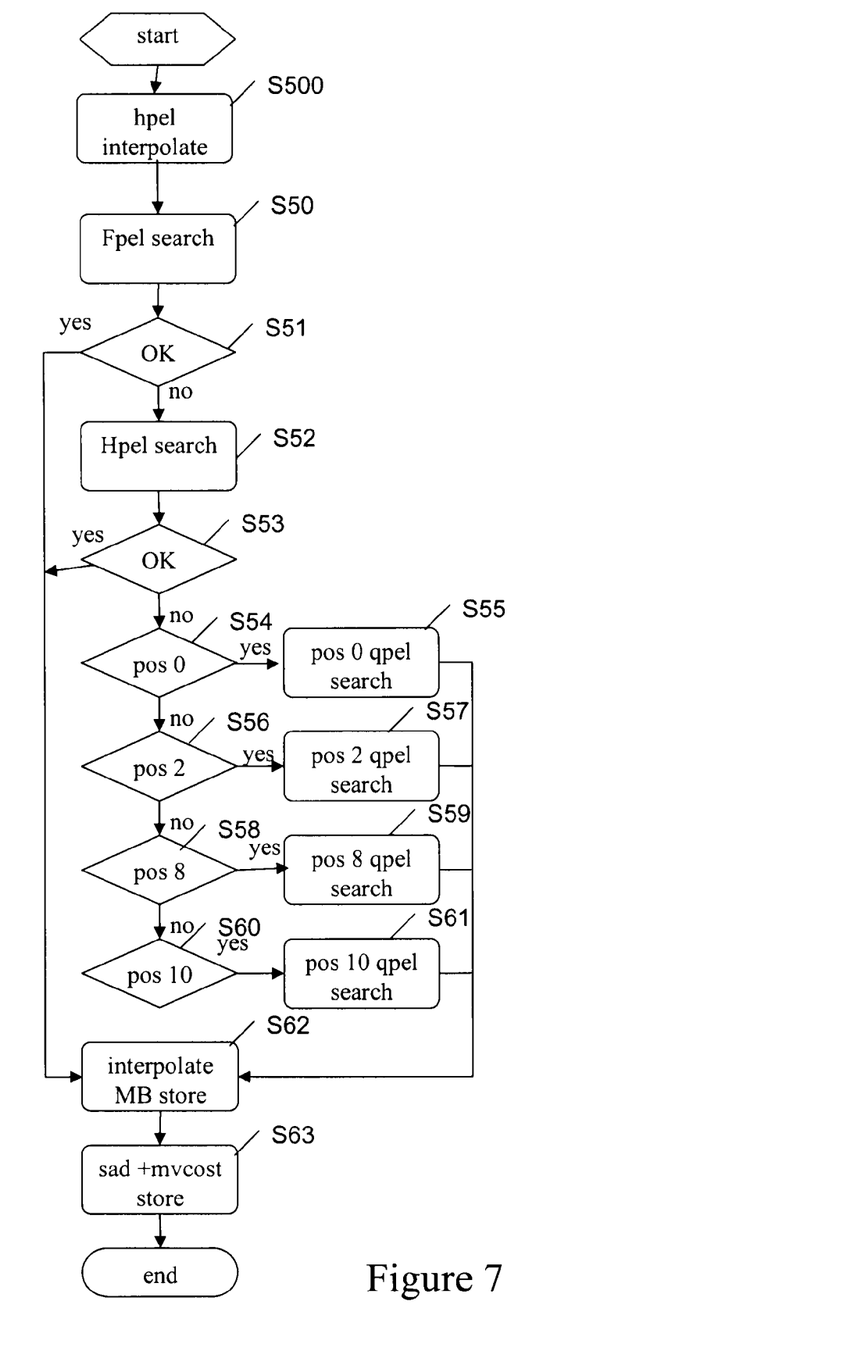
FIG. 7 is a flowchart of an alternative process performed according to at least one disclosed embodiment.

In reference to FIG. 7, an alternative process is performed where an additional step, S500, of performing at least some subset of half pixel interpolations is done in advance to complement the half pixel search performed using bilinear equations. Moreover, while the remaining steps S50-S63 are the same as in FIG. 6, an added step is performed at the beginning of the process where actual interpolation values of a subset of half pixels are stored in advance to augment the values calculated in step S52. An advantage with this approach is that at least some half pixel values may be used to help remove any bias in the calculations performed for other half pixel values and quarter pixel values.

The present invention is not in any way limited to this particular motion search. Nevertheless, as an exemplary embodiment, in the half pixel (hpel) search the best half pixel (x) around a full pixel (O) is determined. Using the present approach all half pixel position can be quickly calculated on the fly using simple bilinear average (A+B+1)/2. In the quarter pixel (qpel) search the best quarter pixel (•) around a half pixel (x) is determined. Using the present approach all quarter pixel position can be quickly calculated on the fly by a combination of successive bilinear averages (A+B+1)/2 and (A+B)/2.

Then after the best motion vector has been found, the actual macroblock (or N×N block) and the actual SAD and MVcost are all calculated according to the standard procedure.

Before explaining exemplary bilinear averages for the sub-pixel positions, some notation with respect to processing steps may be beneficial. Most modern microprocessors have the ability to calculate the average of two pixels in a single clock cycle. Moreover many SIMD (Single Instruction Multiple Data) architectures can calculate the average of two vectors of pixels in a single clock cycle. In practice averages involving integers are subject to rounding. The rounding can either be up or down. The symbol >> represents a shift operation, which has the function of averaging. Thus, to shift up, a +1 is added to the A and B pixel values, which biases the average upward. If the +1 is not included the shifting process will bias the average downward, as explained in the following two equations.

$$Q=(A+B+1)>>1 \text{(up)}$$

$$Q=(A+B)>>1 \text{(down)}$$

The instruction implemented in the processor's hardware is usually the round up calculation; however, the round down calculation can be rewritten to the same form due to the binary representation of negative numbers. The symbol ~ represents converse.

$$Q=(A+B+1)>>1 \text{(up)}$$

$$Q=\sim((\sim A+\sim B+1)>>1)\text{(down)}$$

For the purpose of illustrating how effective average instructions can be used on the fly in the motion search, FIG. 5 is an example of 16 quarter pixel positions in according to H264. Full pixel positions are indicated by "O", half pixel positions by "x" and quarter pixel positions by "•". The present example is not in any way limiting to the approximations in this example, as many different combinations of averages can be applied. The pixel and sub-pixel positions marked as 0-15 in FIG. 5 are calculated as follows, assuming the center pixel from the full N×N block search indicates pixel A as the closest motion vector:

$$Q0=A$$

$$Q1=\{A+[(A+B)/2]+1\}/2=\{A+[(A+B)>>1]+1\}>>1$$

$$Q2=(A+B+1)>>1$$

$$Q3=\{B+[(A+B)/2]+1\}/2=\{B+[(A+B)>>1]+1\}>>1$$

$$Q4=\{A+[(A+C)/2]+1\}/2=\{A+[(A+C)>>1]+1\}>>1$$

$$Q5=\{(A+B)/2+(A+C)/2+1\}/2=\{[(A+B)>>1]+[(A+C)>>1]+1\}>>1$$

$$Q6=\{(A+C)/2+B+1\}/2=\{[(A+C)>>1]+B+1\}>>1$$

$$Q7=\{(A+B)/2+(B+D)/2+1\}/2=\{[(A+B)>>1]+[(B+D)>>1]+1\}>>1$$

$$Q8=(A+C+1)>>1$$

$$Q9=\{(C+D)/2+A+1\}/2=\{[(C+D)>>1]+A+1\}>>1$$

$$Q10=\{[(A+D)>>1]+[(B+C)>>1]+1\}>>1$$

$$Q11=\{(A+B)/2+D+1\}/2=\{[(A+B)>>1]+D+1\}>>1$$

$$Q12=\{C+[(A+C)/2]+1\}/2=\{C+[(A+C)>>1]+1\}>>1$$

$$Q13=\{(A+C)/2+(C+D)/2+1\}/2=\{[(A+C)>>1]+[(C+D)>>1]+1\}>>1$$

$$Q14=\{(B+D)/2+C+1\}/2=\{[(B+D)>>1]+C+1\}>>1$$

$$Q15=\{(C+D)/2+(B+D)/2+1\}/2=\{[(C+D)>>1]+[(B+D)>>1]+1\}>>1$$

Although the bilinear equations for the 16 pixel and sub-pixel positions are given for the bottom left quadrant, a similar process is also performed for the other three quadrants. For example, if pixel A is deemed the best full pixel within the N×N block, the next step is to determine half pixel positions with respect to pixel A. The half pixel positions are 2, 10 and 8 for the lower right quandrant, with respect to A. A similar search could then be performed for half pixel positions with respect to pixel A in the other three quadrants. Assuming half pixel position 10 is judged to be the best, the next step is to consider the quarter pixel positions located around half-pixel position 10. These positions, would be 6, 7, 11, 15, 14, 13, 9 and 5. The best quarter pixel position would then be determined although 10 could also be selected as the best from among the set. Once the best sub-pixel positioned is found, the motion vector is established to include the sub-pixel position.

Figure 8:
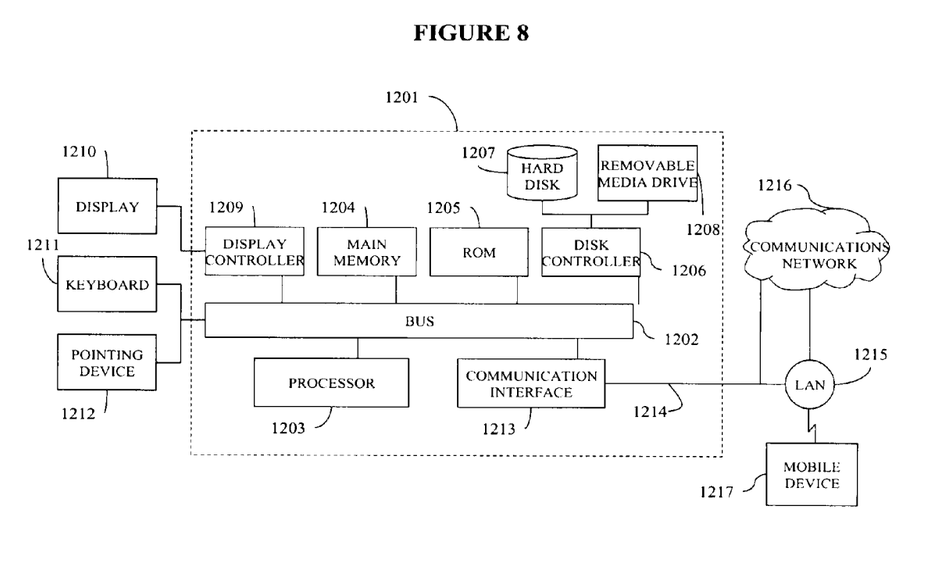
FIG. 8 is a block diagram of a computer implemented video conferencing endpoint that may host the dynamic motion estimation apparatus, computer program product and process as described herein.

FIG. 8 illustrates a computer system 1201 upon which an embodiment of the present invention may be implemented. The computer system 1201 may be programmed to implement a computer based video conferencing endpoint that includes a video encoder or decoder for processing real time video images. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A video encoder comprising:
an interface configured to receive pixels of an image and information from a reference image; and
a processor configured to perform a first sub-pixel search including
performing a plurality of dynamic bilinear calculations on said pixels to develop approximated interpolated sub-pixel values,
comparing said approximated sub-pixels to a first threshold to identify a motion vector corresponding to a lowest cost sub-pixel of said approximated interpolated sub-pixels,
comparing the lowest cost sub-pixel of said approximated interpolated sub-pixels to a second threshold;
when the lowest cost sub-pixel of said approximated interpolated sub-pixels exceeds the second threshold, calculating actual interpolated sub-pixel values using a finite impulse response filter; and
when the lowest cost sub-pixel of said approximated interpolated sub-pixels is less than the second threshold, performing a second sub-pixel search different from the first sub-pixel search.

2. The video encoder of claim 1, wherein the first threshold is a fixed threshold, and the second threshold is a function of a maximum pixel value and a quality parameter.

3. The video encoder of claim 1, wherein said processor is configured to compare said approximated sub-pixel values to one another to identify the lowest cost sub-pixel.

4. The video encoder of claim 1, wherein said cost is a function of a sum of absolute differences between said respective sub-pixels in said image frame and corresponding sub-pixels from the reference frame.

5. The video encoder of claim 1, wherein
said processor is configured to track a difference in cost between the lowest cost subpixel as determined in said comparing and as determined using said finite impulse response filter.

6. The video encoder of claim 5, wherein the processor reduces an interpolation bias in a motion vector search for a later image by applying the difference to a lowest cost sub-pixel in the later image having a corresponding subpixel position to said lowest cost subpixel determined by said processor in said comparing.

7. The video encoder of claim 1, wherein the processor is configured to perform the plurality of dynamic bilinear calculations using bilinear average instructions.

8. A video encoding method comprising:
receiving pixels of an image and information from a reference image;
performing a first sub-pixel search with a processor, said search including performing a plurality of on the fly bilinear calculations on said pixels to develop approximated interpolated sub-pixel values, and comparing said approximated sub-pixels to a first threshold to identify a motion vector corresponding to a lowest cost sub-pixel of said approximated interpolated sub-pixels, comparing the lowest cost sub-pixel of said approximated interpolated sub-pixels to a second threshold;

when the lowest cost sub-pixel of said approximated interpolated sub-pixels exceeds the second threshold, calculating actual interpolated sub-pixel values using a multi-tap filter; and when the lowest cost sub-pixel of said approximated interpolated sub-pixels is less than the second threshold, performing a second sub-pixel search different from the first sub-pixel search.

9. The method of claim 8, wherein said comparing includes comparing said approximated interpolated sub-pixels to a fixed threshold.

10. The method of claim 8, wherein said comparing includes comparing said approximated sub-pixel values to one another to identify the lowest cost sub-pixel.

11. The method of claim 8, wherein said cost is a function of a sum of absolute differences between said respective sub-pixels in said image frame and corresponding sub-pixels from the reference frame.

12. The method of claim 8, further comprising:
determining an actual cost of the lowest cost sub-pixel using the multi-tap filter after said processor completes said comparing.

13. The method of claim 8, further comprising:
reducing an interpolation bias in a motion vector search for a later image by applying the difference to a lowest cost subpixel in the later image having a corresponding sub-pixel position to said lowest cost subpixel determined said comparing.

14. The method of claim 8, wherein the performing step includes performing the on the fly calculations using bilinear average instructions.

15. A non-transitory computer readable storage device having instruction stored therein that when executed by a processor perform a method comprising:
receiving pixels of an image and information from a reference image;
performing a sub-pixel search with a processor, said search including
performing a plurality of bilinear calculations on said pixels to develop approximated interpolated sub-pixel values, and comparing said approximated sub-pixels to a threshold to identify a motion vector corresponding to a lowest cost sub-pixel of said approximated interpolated sub-pixels, comparing the lowest cost sub-pixel of said approximated interpolated sub-pixels to a second threshold;

when the lowest cost sub-pixel of said approximated interpolated sub-pixels exceeds the second threshold, calculating actual interpolated sub-pixel values using a finite impulse response filter; and when the lowest cost sub-pixel of said approximated interpolated sub-pixels is less than the second threshold, performing a second sub-pixel search different from the first sub-pixel search.

16. The non-transitory computer readable storage device of claim 15, wherein said comparing includes
comparing said approximated interpolated sub-pixels to a fixed threshold.

17. The non-transitory computer readable storage device of claim 15, wherein said comparing includes comparing said approximated sub-pixel values to one another to identify the lowest cost sub-pixel.

18. The non-transitory computer readable storage device of claim 15, wherein said cost is a function of a sum of absolute differences between said respective sub-pixels in said image frame and corresponding sub-pixels from the reference frame.

19. The non-transitory computer readable storage device of claim 15, wherein said method further comprising:
determining an actual cost of the lowest cost sub-pixel using the multi-tap filter after said processor completes said comparing.

20. The non-transitory computer readable storage device of claim 19, wherein said method further comprising:
determining a difference in cost between the lowest cost subpixel as determined in said comparing and as determined using said multi-tap filter.

21. The non-transitory computer readable storage device of claim 20, wherein said method further comprising:
reducing an interpolation bias in a motion vector search for a later image by applying the difference to a lowest cost subpixel in the later image having a corresponding sub-pixel position to said lowest cost subpixel determined said comparing.

22. The non-transitory computer readable storage device of claim 15, wherein the performing step includes performing the bilinear calculations using bilinear average instructions.

* * * * *